Dec. 5, 1933.  E. P. BRADY  1,938,511
UNDERGROUND LAWN SPRINKLER HEAD
Filed Dec. 31, 1931
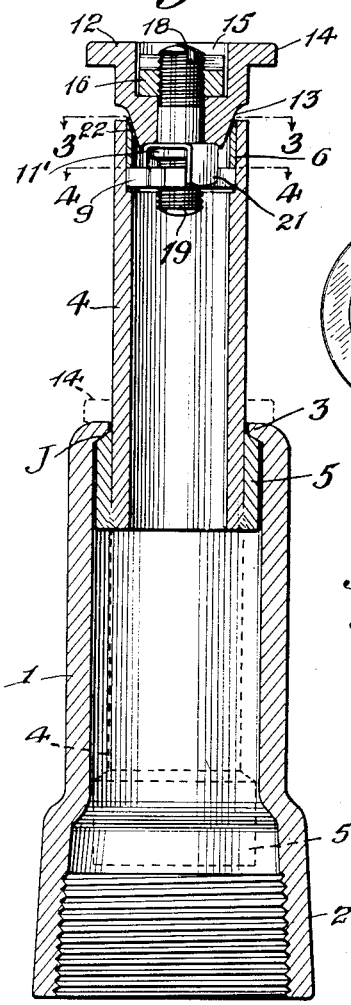
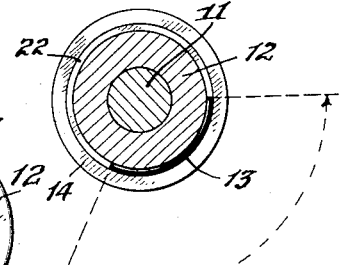
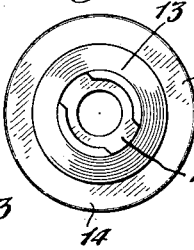
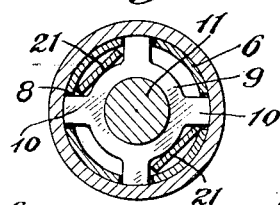
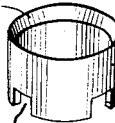
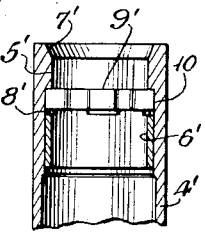
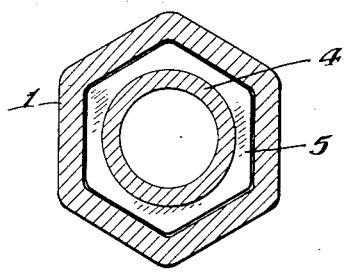
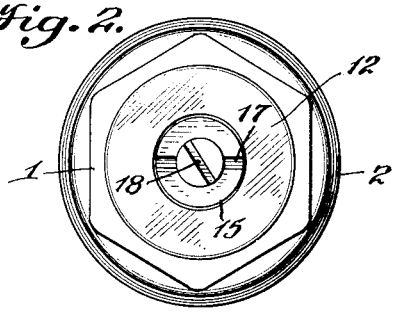
Inventor
Ernest P. Brady.
By Linton, Kellogg + Smith.
Attorneys Patented Dec. 5, 1933

1,938,511

UNITED STATES PATENT OFFICE 1,938,511

UNDERGROUND LAWN SPRINKLER HEAD

Ernest P. Brady, Flint, Mich.

Application December 31, 1931. Serial No. 584,232

3 Claims. (Cl. 299—130)

The present invention relates to underground lawn sprinkling systems which consist generally of a suitable piping buried within the ground for supplying water under pressure to a plurality of nozzles placed at intervals within a lawn to be sprinkled, these nozzles when in their normal inoperative position, being concealed from view within the lawn, but when the water under pressure is supplied to each nozzle through such piping, they will be caused to automatically rise above the lawn to an operative position wherein a given area of the lawn may be properly sprinkled. The invention relates more particularly to a nozzle or sprinkler head used in connection with the aforesaid sprinkler system having amongst its principal desiderata to provide a device capable of functioning in a manner as to eject a spray of water therefrom over a circular area or any sector of such an area in order that the water will be evenly distributed over the lawn and not upon the walks, drives, buildings, or other surrounding objects which do not require watering.

Another and equally important object of the present invention is to provide a lawn sprinkler head which, when in its normal inoperative position, will not only be concealed from view within the lawn, but will cover the supply pipe in order to prevent dirt or other foreign matter from entering the same, and which, when in its operative or raised position, water of the proper or required density will be sprayed over a predetermined area in order that the required supply of water to a lawn or the shrubberies adjacent a lawn, will be properly distributed.

Yet another object of the invention is to provide a lawn sprinkler head, the construction of which is such that convenient and ready access may be had to the working parts thereof for adjustment, repair or replacement, as conditions may require, and one which may be easily and readily adjusted to effect the density and angularity of the spray of water ejected therefrom.

Other objects of the invention will be in part obvious and in part pointed out hereinafter.

In order that the invention and its mode of operation may be readily understood by persons skilled in the art, I have in the accompanying illustrative drawing and in the detailed following description based thereon, set out several possible embodiments of the same.

In the drawing:

Figure 1 is a vertical section through the nozzle embodying the present invention, when in its elevated or operative position;

Figure 2 is a top plan view of the same on a slightly enlarged scale;

Figure 3 is a horizontal section taken on the line 3—3 of Figure 1;

Figure 4 is another horizontal section taken on the line 4—4 of Figure 1;

Figure 5 is a horizontal section taken through the nozzle when in its inoperative position, or the sprinkler head has assumed the position as indicated in dotted lines in Figure 1;

Figure 6 is a detail perspective view of the spray controlling washer;

Figure 7 is a detail bottom plan view of the head or spreader of the nozzle, and Figure 8 is a detail perspective view of the valve seat.

Figure 9 is another vertical section through the nozzle showing a slightly modified form of the invention.

In the lawn sprinkler systems to which the present invention pertains, there is buried in the ground below the lawn, suitable piping and through manually controlled valves, the water under pressure is supplied to this piping. Joined to this piping at the proper intervals, and buried within the ground so that they will be concealed from view, are nozzles or sprinkling devices for distributing the water over a lawn as it is supplied thereto, and referring now more particularly to the accompanying drawing wherein like parts are designated by similar reference characters throughout the several views, I have disclosed a nozzle which can be advantageously used in connection with such underground lawn sprinkling systems, and which nozzle consists of a main housing 1 adapted to be totally buried within the ground, having an enlarged internally threaded lower end 2 which is to be connected to the piping buried in the ground, whereby, at times, water may be supplied, under pressure, to this housing. The body portion of the housing 1 is preferably of hexagonal cross sectional construction, as is better shown in Figure 5 of the drawing, for a purpose to be later described, and the open upper end of this housing 1 is surrounded by an inwardly projecting flange 3. Vertically slidable within this housing 1 is a tubular casing 4 having its opposite ends open, and a collar 5 secured to the outer lower end thereof by brazing, sweating or, it may be formed as an integral part of the casing 4. The upper marginal edge of the collar 5 is preferably ground or machined at any suitable angle, to provide a joint surface adapted to cooperate with a similar surface formed internally of the flange 3 projecting inwardly from the housing 1, and thus constitute a water-tight connection between the parts 1 and 4 as indicated at J. The outer face of the collar 5 is preferably of a hexagonal design, or that corresponding with the interior surfaces of the housing 1 in order to permit the free vertical movement of the casing 4, but preventing the rotation of the casing 4 within the housing 1. It is, of course, to be herein understood that the housing 1, as well as the collar 5, may be of any other design or construction, as would permit the vertical movement of the casing 4, without rotating within the housing, as is known in this particular art. The upper inner walls of this casing 4 are cut away in order to form a recess, as is better illustrated in Figure 1 of the drawing, and seated within this recess is a valve seat 6 of the construction, better illustrated in Figure 8 of the drawing. This valve seat 6 is preferably cut from a tubular piece of metal having a tapered seat 7 and its lower end cut away to form the recesses 8. Adapted to be loosely received within the recess of the casing 4 is a supporting nut 9 preferably of a spider configuration having a plurality of projecting arms 10 which rest within this recess of the tubular casing 4. After the supporting nut 9 has been placed within the casing 4 in the manner better illustrated in Figures 1 and 4 of the drawing, the tubular valve seat 6 is also inserted within this recess of the casing 4 and secured therein any suitable or well known manner, so that the arms or projections 10 of the nut rest within the slots 8 of this tubular valve seat, whereupon the intermediate portions of the tubular valve seat between the recesses 8 will extend on each side of the arms or projections 10 of the nut so as to prevent the rotation of the nut within the casing 4. However, the slots or recesses 8 are of greater width and height than that of the arms 10 of the nut so that the nut may be free for a slight vertical oscillatory movement, but retained within the casing and prevented from rotation therein. An adjusting screw 11, having a lower threaded end, is engageable with said nut in order that the screw may be adjustably supported in a vertical position by the nut 9.

The water outlet end of this movable casing 4 is to be partially closed by means of the head 12 which latter has a central opening for receiving the adjusting screw 11. The lower end 13 of this head 12 is of a conical contour in order to form a valve adapted to be received within the seat 7 of the valve seat secured within the casing 4 and the upper end of the head 12 is provided with a relatively wide flange 14 adapted to extend beyond the outer periphery of the casing 4 and be seated upon the housing 1 preferably in the manner shown by dotted lines in Figure 1. This head is also provided with a centrally arranged recess 15 in which is seated a lock nut 16, and the latter is in threaded engagement with the upper threaded end of the adjusting screw 11. The outer face of this lock nut 16 is provided with slots or recesses 17 whereupon a suitable tool may be brought into engagement with this lock nut for turning the same upon the adjusting screw 11. In order that the screw 11 may be adjusted in the supporting nut 9 a slot 18 is formed in the upper end of the screw whereby with engagement of a screwdriver or similar tool, the screw may be turned for vertical adjustment upon the supporting nut 9. A locking member indicated by the numeral 21 and preferably stamped from a single sheet of metal in order to form an inverted U-shaped construction, has formed at its medial portion, an opening for receiving the screw 11 and this medial portion of the locking member 21 is seated within the recesses 20 formed within the lower face of the head 12 and the free end of this member 21 extends down between the arms 10 of the supporting nut 9 in order that when the spray head 12 is in the assembled position shown in Figure 1, it will be held against rotation by this locking member 21.

In assembling the various parts of my improved spray nozzle, the casing 4 is inserted within the lower open end of the housing 1 until its upper or outward movement is stopped by the collar 5 contacting with the flange 3 of the housing 1. The supporting nut 9 is then placed in the recess formed within the inner upper end of the casing 4 and the tubular valve seat 6 is secured in place in order that the supporting nut 9 may be properly retained in position within the casing 4. The adjustable screw 11 is then placed in threaded engagement with the supporting nut 9. The locking member 21 is then placed over this adjusting screw 11 until it rests upon the flange 11′, whereat its free ends are positioned between the radially extending arm 10 of the supporting nut and the head 12 placed over the adjusting screw until it is in seating engagement with the locking member 21. The lock nut 16 is then moved to threaded engagement with the screw 11 whereupon the head 12 will be retained or locked in a position as to form an annular opening between the valve seat 7 and the casing of the valve 13, in order that the water may escape through such opening, to be sprayed over the lawn. By adjusting the screw 11, the head may be raised or lowered in order that the size of this opening may be varied, to cause a sheet of water to be ejected from the nozzle, as is required.

Ordinarily a circular spray of water would be ejected from this nozzle, but at times, only a certain area of a lawn requires watering, and in order to control the angularity of the spray of water from the nozzle, I preferably provide a washer 22 which is adapted to be seated over the valve 13 and retained between this valve 13 and the valve seat 7. Any portion of this washer 22 may be cut away as is required, and that portion of the washer which is left open permits the escape of water between the head and the valve seat, whereupon the desired area of a lawn may be sprinkled. When the opposite ends of the washer 22 are spaced apart as indicated in Figure 6 of the drawing, and applied to a nozzle, the water will be permitted to flow only between the spaced ends of the washer, but when a greater area of the lawn is to be watered, the desired portion of this washer may be cut away until that sector of the lawn as illustrated in Figure 3 in dotted lines, to be watered, may be sprayed, or the washer may be eliminated entirely, whereby the complete circular area of the lawn will be sprayed from each nozzle employed in such a sprinkling system.

When the nozzle is in its normal or inoperative position, the casing 4 is received within the housing 1 in the position as shown in dotted lines in Figure 1, whereupon the head 12 covers the upper end of this housing 1 as to prevent dirt or other foreign matter from entering the housing or the piping connected therewith. As this housing is buried within a lawn, it, together with the head 12, is concealed from view, but as water under pressure is supplied to the nozzle, the casing 4 will be forced outwardly or in an elevated position as is shown in Figure 1, whereby the spray head will be elevated to a position above the lawn as to cause a spray of water to be direced over a circular area of the lawn. By adjusting the head so as to control the size of the circular opening between the valve and its valve seat, a very uniform spray and diffusion of the water of the required density, will be effected, in order that shrubbery or the like, arranged adjacent the lawn, which require more water than the grass of the lawn, will be properly watered, and by placing the washer 22 between the valve and its seat, the direction of travel of the spray can be controlled in order to prevent the water from being wasted or covering walks, drives, buildings, or other objects arranged adjacent to a lawn being watered.

Because of the particular assembly of the sprinkler head parts, it will be understood that a certain amount of play is afforded to said head, permitting the same under action of the water pressure, to center itself, thus causing a uniform discharge of the water which will be emitted from the nozzle in an evenly distributed sheet over the surface to be sprinkled.

In the modified form of the invention as disclosed in Figure 9 of the drawing, the upper end of the tubular casing 4' is slightly enlarged to form an annular shoulder 5' and in the upper end of the latter is formed a valve seat 7' for receiving the tapered valve 13. A tubular casing or sleeve 6' is inserted within the lower end of the casing 4 until it strikes the shoulder 5' and this casing 6' is fastened within the casing 4 so as to prevent its removal in any manner that is customary in this particular art. The upper end of the sleeve 6' is provided with a plurality of recesses 8' which correspond with the recesses shown in the valve seat 6 in the preferred form of the invention and seated within these recesses 6' are the arms 10' of the nut 9' whereby the latter will be loosely retained within the casing 4 and prevented from withdrawal by means of the shoulder 5' and the sleeve 6'. The screw 11 of the valve may be adjustably connected to this nut 9' and adjustably retained within the casing as heretofore described in the preferred form of the invention.

Manifestly, the construction herein shown is capable of considerable modification and such modifications as come within the scope of my claims, I consider within the spirit of my invention.

I claim:—

1. A sprinkling device of the character described comprising a tubular casing having a discharge outlet at one of its ends and provided with an internal recess in said end; a supporting nut freely fitted in said recess; means secured to said casing for loosely retaining the nut within the latter; a stem having one end portion in adjustable engagement with said nut; means slidably received upon said stem and disposed for engagement with the supporting nut; a valve freely carried by said stem and positioned over said nut engaging means, and, an element in engagement with the free end of the stem and bearing against adjacent portions of the valve to force the latter in rigid frictional engagement with said nut engaging means to secure both said valve and nut engaging means to the stem, thereby fixedly assembling said valve, nut engaging means and stem, and locking said assembly with relation to the supporting nut due to the engagement of the latter with said nut engaging means.

2. A sprinkling device of the character described comprising a tubular casing having a discharge outlet at one of its ends and provided with an internal recess in said end; a spider-shaped supporting nut freely fitted in said recess; means secured to said casing for loosely retaining the nut within the latter; a stem having one end portion in adjustable engagement with said nut; means slidably received upon said stem and disposed for engagement with said spider-shaped supporting nut; a valve freely carried by the stem and having a slot therein for receiving said last mentioned means; and, an element in engagement with the free end of the stem and bearing against adjacent portions of the valve to force the latter in rigid frictional engagement with said nut engaging means and to secure both said valve and nut engaging means to the stem, thereby fixedly assembling said valve, nut engaging means and stem, and locking said assembly with relation to the supporting nut due to the engagement of the latter with said nut engaging means.

3. A sprinkling device of the character described comprising a tubular casing having a discharge outlet at one of its ends and provided with an internal recess in said end; a spider-shaped supporting nut freely fitted in said recess; a sleeve introduced within said end of the casing and formed with recesses accommodating the arms of said spider-shaped nut, thereby cooperating with said recess of the casing for loosely retaining the nut within the latter but preventing rotation thereof; a stem having one end portion in adjustable screw threaded engagement with said nut; an inverted U-shaped member slidably received upon said stem and disposed for engagement with the spider-shaped supporting nut; a valve freely carried by the stem and positioned over said member; and, an element in screw threaded engagement with the free end of the stem and bearing against adjacent portions of the valve to force the latter in rigid frictional engagement with said member and to secure both said valve and member to the stem, thereby fixedly assembling said valve, member and stem, and locking said assembly with relation to the supporting nut due to the engagement of the latter with said member.

ERNEST P. BRADY.